United States Patent Office 3,330,782
Patented July 11, 1967

3,330,782
BETA-(N,N-DIMETHYLAMINO)ALKYL ETHERS AS CATALYSTS FOR ISOCYANATE REACTIONS
Fedor Poppelsdorf, Charleston, W. Va., assignor to Union Carbide Corporation, a corporation of New York
No Drawing. Filed Nov. 12, 1963, Ser. No. 323,148
19 Claims. (Cl. 260—2.5)

The invention relates to catalysts for the reaction of organic isocyanates with active hydrogen-containing compounds. In one aspect, the invention relates to the use of certain tertiary amine ethers as catalysts for the reaction of organic isocyanates with active hydrogen-containing compounds. In another aspect, the invention relates to the production of polymeric reaction products by the reaction of organic polyisocyanates with active hydrogen-containing compounds.

Tertiary amines as a class generally show catalytic activity for the reaction or organic isocyanates with active hydrogen-containing compounds. For example, see "Part IV. Kinetics and Catalysis of Reactions" of Saunders et al. "Polyurethanes: Chemistry and Technology—Part I. Chemistry," Interscience Publishers. However, there are only a few tertiary amines that have attained commercial importance as catalysts for the reaction of organic isocyanates with active hydrogen-containing compounds. The most active of such tertiary amine catalysts are 1,4-diazabicyclo[2.2.2]octane and N,N,N',N'-tetramethyl-1,3-butanediamine. U.S. Patent 2,941,967 discloses the use of certain tertiary amines that contain ether oxygen as catalysts in polyurethane foams. These tertiary amine ethers have not attained commercial importance as catalysts in the polyurethane industry because their catalytic power in accelerating the isocyanate-active hydrogen reaction is substantially weaker than, for instance, the two amines mentioned above which have attained such commercial importance.

In accordance with the present invention it has been discovered that a certain class of tertiary amine ethers display surprising and unexpected strength in accelerating the isocyanate-active hydrogen reaction. The tertiary amine ethers which are employed in the invention are the bis[beta-(N,N-dimethylamino)alkyl] ethers wherein the alkyl is either ethyl or propyl. Accordingly, the process of the invention comprises reacting an organic isocyanate with an active hydrogen-containing compound in the presence of a catalytic quantity of a bis[beta-(N,N-dimethylamino)alkyl] ether wherein said alkyl is either ethyl or propyl.

The bis[beta-(N,N-dimethylamino) alkyl] ethers that are employed in the process of the invention are bis[2-(N, N - dimethylamino)ethyl] ether, bis[2-(N,N-dimethylamino)-1-methyl-ethyl] ether, and 2-(N,N-dimethylamino)ethyl 2 - (N,N - dimethylamino) - 1 - methylethyl ether. The preferred tertiary amine ether is bis[2-(N,N-dimethylamino)ethyl] ether.

Bis[2-(N,N-dimethylamino)ethyl] ether can be produced by the reaction of bis(2-chloroethyl) ether with excess dimethylamine. This synthesis is reported in the literature, for instance, by Marxer et al., K. Helv. Chim. Acta 34, 924 (1951) and by Hromataka et al., Monatsh. 84, 349 (1953). Another route to this compound is to employ the classical Williamson ether synthesis, for example:

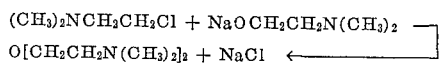

This method can be employed to produce bis[2-(N,N-dimethylamino) - 1 - methylethyl]ether and 2-(N,N-dimethylamino)ethyl 2 - (N,N-dimethylamino)-1-methylethyl ether, as reported by Fakstrop et al., Acta Chemica Scandinavica 7, pages 134–139 (1953).

The process of the invention is preferably employed in the reaction of organic polyisocyanates with compositions having at least 2 active hydrogen atoms, although monofunctional reactants can be employed, for example, in the production of compositions useful as plasticizers and in organic syntheses. Among the organic isocyanates that can be employed in the invention are monoisocyanates such as phenyl isocyanate, tolyl isocyanates, benzyl isocyanate, xylyl isocyanates, hexyl isocyanate, and other aromatic and aliphatic isocyanates. Preferred isocyanates for use in the process of the invention are organic polyisocyanates. Illustrative polyisocyanates include, among others, 2,4- and 2,6-tolylene diisocyanate, 3,3'-tolidene 4,4'-diisocyanate, isocyanates produced by phosgenation of the condensation products of formaldehyde and various aromatic amines such as bis(3-methyl-4-isocyanatophenyl)methane, bis(4-isocyanatophenyl)methane, and isocyanates disclosed in U.S. Patent No. 2,683,730, and the like. Additional polyisocyanates that are useful in the invention include 1,5-naphthalene diisocyanate, xylylene-diisocyanates, 1,3-phenylene diisocyanate, tris(4-isocyanatophenyl)methane, chlorophenylene diisocyanates, hexamethylene diisocyanate, bis(3-isocyanatopropoxy)ethane, and many others. Other organic monoisocyanates and polyisocyanates than can be employed in the process of the invention are disclosed in the literature, for example, in an article by Siefken, Annalen 562, pages 75–135 (1949), in U.S. Patents 3,093,451 and 3,084,177 and in the Saunders et al. text (cited above). The aromatic polyisocyanates are particularly useful in the invention, especially the tolylene diisocyanates and the polyisocyanates produced by phosgenation of the condensation products of aniline and formaldehyde.

In the process of the invention one or more organic isocyanates are reacted with one or more active hydrogen-containing compounds. The active hydrogen compounds contemplated are those which contain reactive hydrogen as determined by the procedure described by Zerewitinoff, J. Am. Chem. Soc., 49, page 3181 (1927). Among the various classes of compounds that contain reactive hydrogen are alcohols, water, amines, ureas, urethanes, phenols, thiols, carboxylic acids, and the like. The preferred active hydrogen-containing reactants are water and primary and secondary alcohols. Since urethanes, amines, and ureas are produced when an isocyanate is reacted with an alcohol and water, urethanes, amines, and ureas are also preferred reactants. The amines are also very useful reactants in many cases, for example, when the process of the invention is employed to produce an amine-cured elastomer.

A large variety of alcohols can be used in the invention. For instance, alkanols such as methanol, ethanol, 2-propanol, butanol, 2-ethylhexanol, and many other alkanols. The preferred alcohols for use in the invention are the polyols, for instance, one or more polyols from the following classes of compositions:

(a) Hydroxyl-terminated polyesters and polyesterethers;
(b) Polyhydroxyalkanes and alkylene oxide adducts thereof;
(c) Trialkanolamines and alkylene oxide adducts thereof;
(d) Alcohols derived from mono- and polyamines by addition of alkylene oxides;
(e) Non-reducing sugar and sugar derivatives and alkylene oxide adducts thereof;
(f) Alkylene oxide adducts of aromatic amine/phenol/aldehyde ternary condensation products;
(g) Alkylene oxide adducts of phosphorus and polyphosphorus acids, and various hydroxyl-terminated phosphites and phosphonates;
(h) Alkylene oxide adducts of polyphenols;
(i) Polytetramethylene glycols;
(j) Functional glycerides, such as castor oil;
(k) Hydroxyl-containing polymers; and the like.

Illustrative hydroxyl-terminated polyesters are those which are prepared by polymerizing a lactone (preferably, an epsilon-caprolactone) in the presence of an active hydrogen-containing starter as disclosed in U.S. Patents 2,914,556; 2,890,208; 2,878,236; and 2,977,385. Polyesters from adipic acid and diols such as ethylene glycol, propylene glycol, diethylene glycol, dipropylene glycol, and the like, and triols such as 1,1,1-trimethylolpropane, 1,2,6-hexanetriol, glycerol, and others, are also useful. Copolymers of lactones and alkylene oxides such as those described in U.S. Patent 2,962,524, can also be used with good results.

Illustrative polyhydroxyalkanes include, among others ethylene glycol, propylene glycol, 1,3-dihydroxypropane, 1,3-dihydroxybutane, 1,4-dihydroxybutane, 1,4-, 1,5-, and 1,6-dihydroxyhexane, 1,2-, 1,3-, 1,5-, 1,6-, and 1,8-dihydroxyoctane, 1,10-dihydroxydecane, glycerol, 1,2,5-trihydroxybutane, 1,2,6-trihydroxyhexane, 1,1,1-trimethylolethane, 1,1,1-trimethylolpropane, pentaerthritol, xylitol, arabitol, sorbitol, mannitol, and the like. The alkylene oxide adducts of the above-exemplified polyhydroxyalkanes can also be employed, preferably the ethylene oxide, propylene oxide, the epoxybutane, the epichlorohydrin, or mixtures thereof, adducts of said polyhydroxyalkanes.

Another useful class of polyols which can be employed are the trialkanolamines and the alkylene oxide adducts thereof. Illustrative trialkanolamines include triethanolamine, triisopropanolamine, and tributanolamines. The alkylene oxide adducts which can be employed are preferably those wherein the oxyalkylene moieties thereof have from 2 to 4 carbon atoms.

Another useful class of polyols which can be employed are the alkylene oxide adducts of mono- and polyamines. The mono- and polyamines are preferably reacted with alkylene oxides which have 2 to 4 carbon atoms, for example, ethylene oxide, 1,2-epoxypropane, the epoxybutanes, and mixtures thereof. Mono- and polyamines suitable for reaction with alkylene oxides include, among others, methylamine, ethylamine, isopropylamine, butylamine, benzylamine, aniline, the toluidines, naphthylamines, ethylenediamine, diethylenetriamine, triethylenetetramine, 1,3-butanediamine, 1,3-propanediamine, 1,4-butanediamine, 1,2-, 1,3-, 1,4-, 1,5-, and 1,6-hexanediamine, phenylenediamines, toluenediamine, naphthalenediamines, and the like. Among the compounds of the above groups which are of particular interest are, among others, N,N,N',N'-tetrakis(2-hydroxyethyl)ethylenediamine, N,N,N',N",N"-pentakis(2-hydroxypropyl)diethylmine, N,N,N',N",N"-pentagis(2-hydroxypropyl)diethylenetriamine, phenyldiisopropanolamine and higher alkylene oxide adducts of aniline, and the like. Others which deserve particular mention are the alkylene oxide adducts of aniline or substituted-aniline/formaldehyde condensation products.

A further class of polyols which can be employed are the non-reducing sugars, the non-reducing sugar derivatives, and more preferably, the alkylene oxide adducts thereof wherein the alkylene oxides have from 2 to 4 carbon atoms. Among the non-reducing sugars and sugar derivatives contemplated are sucrose, alkyl glycosides such as methyl glucoside, ethyl glucoside, and the like, polyol glycosides such as ethylene glycol glucoside, propylene glycol glucoside, glycerol glucoside, 1,2,6-hexanetriol glucoside, and the like.

A still further useful class of polyols are the alkylene oxide adducts of polyphenols wherein the alkylene oxides have from 2 to 4 carbon atoms. Among the polyphenols which are contemplated are found, for example, bisphenol A, bisphenol F, condensation products of phenol and formaldehyde, more particularly the novolac resins, condensation products of various phenolic compounds and acrolein, the simplest members of this class being the 1,1,3-tris(hydroxyphenyl)propanes, condensation products of various phenolic compounds and glyoxal, glutaraldehyde, and other dialdehydes, the simplest members of this class being the 1,1,2,2-tetrakis(hydroxyphenyl)ethanes, and the like.

Another desirable class of polyols are the alkylene oxide adducts, preferably the ethylene oxide, 1,2-epoxypropane, epoxybutane, and mixtres thereof, adducts of aromatic amine/phenol/aldehyde ternary condensation products. The ternary condensation products are prepared by condensing an aromatic amine, for instance aniline, toluidine, or the like, a phenol such as phenol, cresol, or the like, and an aldehyde preferably formaldehyde, at elevated temperatures in the range of, for example, from 60° C. to 180° C. The condensation product is then recovered and reacted with alkylene oxide, using a basic catalyst (e.g., potassium hydroxide) if desired, to produce the polyols. The propylene oxide and mixed propylene-ethylene oxide adducts of aniline/phenol/formaldehyde ternary condensation products deserve particular mention.

The alkylene oxide adducts of phosphorus and polyphosphorus acids are another useful class of polyols. Ethylene oxide, 1,2-epoxypropane, the epoxybutanes, 3-chloro-1,2-epoxy-propane, and the like are preferred alkylene oxides. Phosphoric acid, phosphorous acid, the polyphosphoric acids such as tripolyphosphoric acid, and the like are desirable for use in this connection. Also useful are phosphites such as tris(dipropylene glycol) phosphite and the phosphonates which can be produced therefrom by heating in the presence of, e.g., butyl bromide, as well as the alkylene oxide adducts thereof.

Another useful class of polyols are the polytetramethylene glycols, which are prepared by polymerizing tetrahydrofuran in the presence of an acidic catalyst.

Also useful are castor oil and alkylene oxide adducts of castor oil.

Another useful class of polyols are various polymers that contain pendant hydroxyl groups. Illustrative are polyvinyl alcohol, vinyl chloride-vinyl alcohol copolymers, and other copolymers of various ethylenically-unsaturated monomers and vinyl alcohol. Also useful are polymers formed by reacting a dihydric phenol [for instance, 2,2-bis(4-hydroxyphenyl)propane] with epichlorohydrin in the presence of sodium hydroxide, such as the polymers disclosed in U.S. Patent No. 2,602,075.

The polyol or polyol mixture employed can have hydroxyl numbers which vary over a wide range. In general, the hydroxyl numbers of the polyols employed in the invention can range from about 20, and lower, to about 1000, and higher, preferably, from about 30 to about 600, and more preferably, from about 35 to about 450.

The hydroxyl number is defined as the number of milligrams of potassium hydroxide required for the complete neutralization of the hydrolysis product of the fully acetylated derivative prepared from 1 gram of polyol. The hydroxyl number can also be defined by the equation:

$$OH = \frac{56.1 \times 1000 \times f}{M.W.}$$

where:

OH = hydroxyl number of the polyol
$f$ = average functionality, that is, average number of hydroxyl groups per molecule of polyol
M.W. = average molecular weight of the polyol.

The exact polyol employed depends upon the end-use of the polyurethane product of the process of the invention. For example, when used to prepare foams, the functionality and the hydroxyl number are selected properly to result in flexible, semi-flexible, or rigid foams. The above polyols preferably possess a hydroxyl number of from about 200 to about 800 when employed in rigid foam formulations, from about 50 to about 250 for semi-flexible foams, and from about 20 to about 70 or more when employed in flexible foam formulations. Such limits are not intended to be restrictive, but are merely illustrative of the large number of possible combinations of the above polyol coreactants.

Another useful class of active hydrogen-containing reactants is the amines. Illustrative amines include hydrazine, ethylene diamine, diethylenetriamine, triethylenetetramine, monoethanolamine, 1,3-propanediamine, 1,4-butanediamine, aniline, diaminobenzenes, diaminotoluenes, condensation products of aniline or other aromatic amine and formaldehyde, bis(3-chloro-4-aminophenyl)methane, and various other amines. The amines are generally employed wherein the process of the invention is used to produce a polyurethane elastomer, in which case the isocyanate employed is a prepolymer produced by reacting excess diisocyanate with a polyol.

The proportions in which the organic isocyanate and active hydrogen compound are employed are such that there is normally provided about one isocyanato group per active hydrogen-containing group (i.e., hydroxyl, amino, and the like), although the ratios can be varied over a wide range. For instance, in the production of polyurethane foams, usually up to about 5 percent excess isocyanate (over that required to react with all alcoholic hydroxyl and water) is normally employed.

The tertiary amine ethers can be employed as sole catalysts for isocyanate/active hydrogen reactions, or they can be employed in combination with other catalysts. In particular, the organic tin catalysts are advantageously employed in combination with the tertiary amine ethers.

One preferred class of organic tin catalysts are the stannous acylates, for instance, stannous acetate, stannous octoate, stannous laurate, stannous oleate, and the like. Stannous octoate is a highly preferred organic tin catalyst for use in combination with the tertiary amine ethers of the invention.

Another useful class of organic tin catalysts are the organotin compounds. These compounds are characterized by having at least 1 direct carbon to tin valence bond, any remaining bonds to tin being to halogen, oxygen, hydrogen, sulfur, nitrogen, or phosphorus. Among the many organotin compounds that can be employed in the invention are the following:

A. Tin compounds having four carbon to tin bonds such as tetramethyltin, tetraethyltin, tetrapropyltin, tetrabutyltin, tetraoctyltin, tetralauryltin, tetrabenzyltin, tetrakis(2-phenylethyl)tin, tetraphenyltin, tetraparatolyltin, tetravinyltin, tetraallyltin, tetrachloromethyltin, tetramethanesulfonylmethyltin, tetra-para-methoxy-phenyltin, tetrapara-nitrophenyltin, as well as unsymmetrical compounds as exemplified by 2-cyanoethyltributyltin, dibutyldiphenyltin and various addition products of alkyl, aryl and aralkyltin hydrides with unsaturated organic compounds such as acrylonitrile, allyl cyanide, crotonitrile, acrylamide, methyl acrylate, allyl alcohol, acrolein diethyl acetal, vinyl acetate, styrene, and the like;

B. Tin compounds having $n$ carbon to tin bonds and $4-n$ bonds from tin to halogen or hydrogen atoms or hydroxyl groups in which $n$ is an integer in the range of from 1 to 3, such as trimethyltin, chloride, tributyltin chloride, trioctyltin chloride, triphenyltin chloride, trimethyltin bromide, tributyltin fluoride, triallytin chloride, tributyltin hydride, triphenyltin hydride, trimethyltin hydroxide, tributyltin hydroxide, dimethyltin dichloride, dibutyltin dichloride, dioctyltin dichloride, bis(2-phenylethyl)tin dichloride, diphenyltin dichloride, divinyltin dichloride, diallytin dibromide, diallytin diiodide, dibutyltin difluoride, bis(carboethoxymethyl)tin diiodide, bis(1,3-diketopentane)tin dichloride, dibutyltin dihydride, butyltin trichloride and octyltin trichloride;

C. Tin compounds having two carbon to tin bonds and a double bond from tin to oxygen or sulfur, such as dimethyltin oxide, diethyltin oxide, dibutyltin oxide, dioctyltin oxide, dilauryltin oxide, diphenyltin oxide and diallytin oxide, all prepared by hydrolysis of the corresponding dihalides, as well as bis-2-phenylethyltin oxide, [HOOC(CH$_2$)$_5$]$_2$SnO,

[CH$_3$OCH$_2$(CH$_2$OCH$_2$)$_{x-1}$CH$_2$]$_2$SnO

[CH$_3$OCH$_2$(CH$_2$OCH$_2$)$_{x-1}$CH$_2$O(CH$_2$)$_5$]$_2$SnO and dibutyltin sulfide, the $x$'s being whole integers;

D. Tin compounds having $n$ carbon to tin bonds and $4-n$ bonds from tin to oxygen, sulfur, nitrogen or phosphorus linking organic radicals, $n$ being an integer of from 1 to 3, such as tributyltin methoxide, tributyltin butoxide, tributyltin acetate, tributyltin N-piperazinylthiocarbonylmercaptide, tributyltin phosphorus dibutoxide [prepared as indicated immediately below:

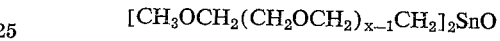

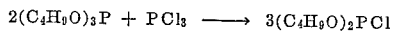

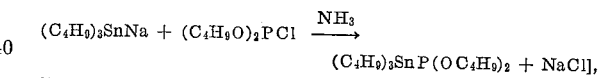

dibutyltin dibutoxide,

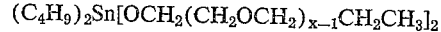

dibutyl bis-(O-acetylacetonyl)tin, dibutyltin bis(octyl maleate), dibutyltin bis(thiododecoxide), dibutyltin bis(octyl thioglycolate), dibutyltin bis(N - morpholinylcarbonylmethylmercaptide), dibutyltin dibenzenesulfonamide, dimethyltin diacetate, diethyltin diacetate, dibutyltin diacetate, dioctyltin diacetate, dilauryltin diacetate, dibutyltin dilaurate, dibutyltin maleate, dibutyltin bis(N-piperazinylthiocarbonylmercaptide), dioctyltin bis(N-piperazinylthiocarbonylmercaptide), octyltin tris(thiobutoxide), butyltin triacetate, methylstannonic acid, ethylstannonic acid, butylstannonic acid, octylstannonic acid,

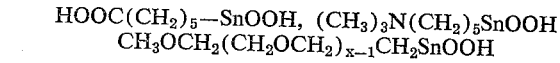

and (CH$_3$OCH$_2$)$_{x-1}$CH$_2$O(CH$_2$)$_5$SnOOH in which the $x$'s are positive integers.

E. Polystannic compounds having carbon to tin bonds and preferably also bonds from tin to halogen, hydrogen, oxygen, sulfur, nitrogen or phosphorus, such as

and HOOSnCH$_2$(CH$_2$OCH$_2$)$_x$CH$_2$SnOOH, the $x$'s being positive integers, bis-trimethyltin, bis-triphenyltin, bis-tributyltin distannoxane, dibutyltin basic laurate, dibutyltin basic hexoxide and other polymeric organo-tin compounds containing carbon to tin bonds and preferably also bonds, e.g., those having repeating

groups, dimers and trimers of $(R_2SnY)_n$ and the like in which the R's may be alkyl, aryl or aralkyl radicals and the Y's are chalcogens, as well as many other organo-tin compounds heretofore proposed as heat and light stabilizers for chlorinated polymers and available commercially for this purpose.

The bis[beta-(N,N-dimethylamino)alkyl] ether catalysts are employed in the process of the invention in catalytically significant quantities. For instance, concentrations in the range of from about 0.001 weight percent, and lower, to about 5 weight percent, and higher, have been found useful. Preferred concentrations are found in the range of from about 0.01 weight percent to about 1.5 weight percent (all percentages being based upon weight reactants, i.e., organic isocyanate plus active hydrogen compound). When one or more additional catalysts are used, the above-indicated range of proportions are also applicable to such other catalysts.

The process of the invention is advantageously employed to produce polymeric products by the reaction of organic polyisocyanates with polyols, polyamines, water, and the like. Particularly preferred polymeric products are polyurethane foams that are produced by reacting an organic polyisocyanate with a polyol in the presence of a blowing agent which can be water, a liquefied gas, or the like. The polyisocyanate and polyol reactants that can be used to produce polyurethane foams are described above. The preferred blowing agents are water and certain halogen-substituted aliphatic hydrocarbons which have boiling points between about −40° C. and 70° C., and which vaporize at or below the temperature of the foaming mass. Illustrative are, for example, trichloromonofluoromethane, dichlorodifluoromethane, dichloromonofluoromethane, dichloromethane, trichloromethane, bromotrifluoromethane, chlorodifluoromethane, chloromethane, 1,1-dichloro-1-fluoroethane, 1,1 - difluoro - 1,2,2 - trichloroethane, chloropentafluoroethane, 1-chloro-1-fluoroethane, 1-chloro-2-fluoroethane, 1,1,2-trichloro-1,2,2 - trifluoroethane, 1,1,1-trichloro-2,2,2-trifluoroethane, 2-chloro-1,1,1,2,3,3,4,4,4 - nonafluorobutane, hexafluorocyclobutene, and octafluorocyclobutane. Other useful blowing agents include low-boiling hydrocarbons such as butane, pentane, hexane, cyclohexane, and the like. Many other compounds easily volatilized by the exotherm of the isocyanate-reactive hydrogen reaction also can be employed. A further class of blowing agents includes thermally-unstable compounds which liberate gases upon heating, such as N,N′-dimethyl-dinitrosoterephthalamide.

The amount of blowing agent used will vary with the density desired in the foamed product. In general it may be stated that for 100 grams of reaction mixture containing an average isocyanate/reactive hydrogen ratio of about 1:1, about 0.005 to 0.3 mole of gas are used to provide densities ranging from 30 to 1 pounds per cubic foot respectively.

In producing foamed reaction products, it is also within the scope of the invention to employ small amounts, e.g., about 0.001% to 5.0% by weight on the total reaction mixture, of an emulsifying agent such as a polysiloxane-polyoxyalkylene block copolymer having from about 10 to 80 percent by weight of siloxane polymer and from 90 to 20 percent by weight of alkylene oxide polymer, such as the block copolymers described in U.S. Patents 2,834,748 and 2,917,480. Another useful class of emulsifiers are the "non-hydrolyzable" polysiloxane-polyoxyalkylene block copolymers. This class of compounds differs from the above-mentioned polysiloxane-polyoxyalkylene block copolymers in that the polysiloxane moiety is bonded to the polyoxyalkylene moiety through direct carbon-to-silicon bonds, rather than through carbon-to-oxygen-to-silicon bonds. These copolymers generally contain from 5 to 95 percent, and preferably from 5 to 50 weight percent, of polysiloxane polymer with the remainder being polyoxyalkylene polymer. The copolymers can be prepared, for example, by heating a mixture of (a) a polysiloxane polymer containing a silicon-bonded, halogen-substituted monovalent hydrocarbon group, and (b) an alkali metal salt of a polyoxyalkylene polymer, to a temperature sufficient to cause the polysiloxane polymer and the salt to react to form the block copolymer. Other useful emulsifiers and surfactants include such materials as dimethyl silicone oil, polyethoxylated vegetable oils, commercially available as "Selectrofoam 6903," "Emulphor EL-720," and others. Although the use of an emulsifier is desirable to influence the type of foam structure that is formed, the foam products of the invention can be prepared without emulsifiers in some cases.

The techniques for producing polyurethane foams by the one shot, prepolymer, or semi-prepolymer methods are well known in the art, as is exemplified by the Saunders et al. text, cited above.

In some cases it is desirable to add a small quantity (e.g., up to 5 parts per 100 parts of polyol) of a dipolar aprotic solvent such as formamide, N,N-dimethylformamide, or dimethylsulfoxide to the foaming formulation. This serves to "open up" the cell structure when there is an undesired tendency to form closed-cell foams.

The process of the invention is highly useful for many applications. For example, where monofunctional reactants are employed, the process is useful for producing compositions having utility as plasticizers and in organic syntheses. Where polyfunctional reactants are employed, the process of the invention is useful for producing polymeric materials having known utility, for instance, rigid and flexible polyurethane foams, polyurethane elastomers, polyurethane surface coatings, amine-cured polyurethane elastomers, and the like.

The examples that follow illustrate the production of several of the bis[beta-(N,N-dimethylamino)alkyl] ethers employed in the process of the invention, their utility in the production of polyurethane foams, and also compare the catalytic activity of representative bis[beta-(N,N-dimethylamino)alkyl] ethers with several tertiary amine catalysts that have been heretofore disclosed.

*Example 1.—Bis[2-(N,N-dimethylamino)ethyl] ether*

Dimethylamine, aqueous 40 percent (4510 grams; 40 moles), was added to a two-gallon stainless steel, stirred, autoclave and heated to 170° C. Bis(2-chloroethyl) ether (1430 grams; 10 moles) was fed continuously to the autoclave over 30 minutes. Heating at 170° C. was continued for 15 minutes after the addition had been completed. The product was a light-brown solution (6091 grams). It contained 20.2 equivalents of Cl⁻ (by Volhard), therefore conversion of the chloroether was:

$$\frac{20.2}{20} \times 100 = 101 \text{ percent}$$

The solution was evaporated almost to dryness at a kettle temperature not in excess of 100° C. under the vacuum afforded by a water pump. Sodium hydroxide, aqueous 50 percent (1600 grams) was added to the semi-solid residue causing the rapid evolution of dimethylamine which was vented. During this treatment the temperature of the mixture did not ris above 30° C. The mixture was mechanically stirred after the solid lumps originally present had disintegrated.

The neutralized residue was distilled at atmospheric pressure through a column having an efficiency of about 15 theoretical plates; was then azeotropically distilled with benzene to remove water; and was then fractionated to yield bis[2-(N,N-dimethylamino)ethyl] ether having the following properties:

Boiling point _____ 76° C./10 mm. Hg.
Refractive index _____ $n_D^{20}$ 1.4306.
Total alkalinity _____ 12.30 meq./g.
Total tertiary amine _____ 12.30 meq./g.
(Calculated—12.48 meq./g.)

Examples 2 and 3

Both bis[2-(N,N-dimethylamino)-1-methylethyl] ether and 2-(N,N-dimethylamino)ethyl 2-(N,N-dimethylamino)-1-methyl-ethyl ether are prepared by the method of Fakstorp et al., cited above.

Example 4.—Evaluation of catalytic activity

The bis[beta-(N,N-dimethylamino)alkyl] ethers of Examples 1–3 were evaluated for their catalytic activity for the isocyanate-alcohol reaction and the isocyanate-water reaction. For purposes of comparison, the catalytic activities of the following tertiary amines were also evaluated:

(4) 1,4-diazabicyclo[2.2.2]octane (for brevity called "DABCO")
(5) N,N,N',N'-tetramethyl-1,3-butanediamine (TMBDA)
(6) N-methylmorpholine (NMM)
(7) N-ethylmorpholine (NEM)
(8) Bis[2-(N,N-diethylamino)ethyl] ether
(9) Methyl 2-(N,N-dimethylamino)ethyl ether
(10) Bis[3-(N,N-dimethylamino)propyl] ether
(11) 1,2-bis[2-(N,N-dimethylamino)ethoxy]ethane.

It is pointed out that amines Nos. 4–7 are currently the most important tertiary amine catalysts used commercially in the production of polyurethane foams, and amines Nos. 8–11 are representative of the tertiary amine ethers disclosed by U.S. Patent No. 2,941,967.

The method of analysis of catalytic activity was based upon an infrared spectrophotometric technique whereby the rate of consumption of phenyl isocyanate by either 1-butanol or water (under the influence of various catalyst systems) was measured. From this data, the second-order rate constant of each catalyzed reaction was calculated.

In view of the fact that tertiary amines are frequently employed in combination with organic tin compounds as catalysts for isocyanate reactions, the catalytic activity of the amines in combination with stannous octoate was also measured.

Each reaction was conducted at 25° C. in a reaction mixture that is described below. The rate reaction is measured by recording the decrease in isocyanate concentration as a function of time. For the alcohol-isocyanate reaction leading to a urethane this represents the true picture since the further reaction, the formation of allophanate from isocyanate and urethane, is negligibly small in comparison with the first reaction,[1] in particular at the relatively low temperature of 25° C. However, in the water-isocyanate reaction, the isocyanate is consumed first by the water which leads to the formation of an amine via carbanilic acid as intermediate, and second by the amine formed from the first reaction to produce a urea. The exact value of the rate constant for the water-isocyanate reaction can, therefore, only be found in the first stages of the reaction period before any appreciable amount of amine is formed.

Although there are a number of analytical methods available for determination of isocyanates, the infrared absorption technique was employed since it lends itself more than any other method to kinetics studies. The disappearance of the 4.42 microns band, associated with unsymmetrical bond stretching effects in isocyanates, was measured to follow the course of the reaction. This measurement gives the value for the amount of isocyanate reacted.

Each catalyst was studied in a series of 4 reactions. The first reaction contained stannous octoate alone as catalyst, the second reaction contained tertiary amine alone as catalyst, and the third and fourth reactions contained both stannous octoate and tertiary amine. The catalyst concentrations (in millimoles/milliliter of reaction mixture) for each reaction are displayed in Table I, below:

TABLE I.—CATALYST CONCENTRATIONS

| Reaction | Concentration of Stannous Octoate (mM./ml.) | Concentration of Amine (mM./ml.) |
|---|---|---|
| 1 | $2 \times 10^{-3}$ | |
| 2 | | $8 \times 10^{-3}$ |
| 3 | $2 \times 10^{-3}$ | $2 \times 10^{-3}$ |
| 4 | $2 \times 10^{-3}$ | $4 \times 10^{-3}$ |

The reaction mixture was prepared from the following standard solutions:

Each amine catalyst — 0.100 molar in toluene.
Stannous octoate — 0.010 molar in toluene.
Phenyl isocyanate — 0.920 molar in toluene.
1-butanol — 0.437 molar in toluene.
Water — 0.333 molar in N,N-dimethylformamide/toluene (1:4-vol.:vol.).
Solvent — N,N-dimethylformamide/toluene in 1:9 (vol./vol.) for the alcohol/isocyanate reaction and 2:8 (vol./vol.) for the water-isocyanate reaction.

Each of the reactions 1 through 4 (Table I, above) were conducted by adding the above-described solutions in the order listed below in Table II:

TABLE II.—SCHEME FOR ORDER OF ADDITION OF REACTANTS IN CATALYZED ISOCYANATE REACTIONS

A. WITH 1-BUTANOL

| Constitutents (in order of addition) | Reaction No. | | | |
|---|---|---|---|---|
| | 1, ml. | 2, ml. | 3, ml. | 4, ml. |
| 1-butanol Standard Solution | 20 | 20 | 20 | 20 |
| Dimethylformamide | 5 | 5 | 5 | 5 |
| Toluene | 10 | 16 | 9 | 8 |
| Stannous Octoate Standard Solution | 10 | | 10 | 10 |
| Amine Catalyst Standard Solution | | 4 | 1 | 2 |
| Phenyl Isocyanate Standard Solution | 5 | 5 | 5 | 5 |

B. WITH WATER

| | 1, ml. | 2, ml. | 3, ml. | 4, ml. |
|---|---|---|---|---|
| Water Standard Solution | 25 | 25 | 25 | 25 |
| Dimethylformamide | 5 | 5 | 5 | 5 |
| Toluene | 5 | 11 | 4 | 3 |
| Stannous Octoate Standard Solution | 10 | | 10 | 10 |
| Amine Catalyst Standard Solution | | 4 | 1 | 2 |
| Phenyl Isocyanate Standard Solution | 5 | 5 | 5 | 5 |

In view of the fact that a mixture of DABCO and N-alkylmorpholine is frequently employed as a catalyst in the production of polyurethane foams, five additional catalyzed reactions were studied with N-methylmorpholine. The catalyst concentrations for each of these reactions are listed in Table III, below:

TABLE III.—CATALYST CONCENTRATIONS FOR MORPHOLINE SERIES

| Reaction | Concentration Stannous Octoate (mM./ml.) | Concentration N-alkylmorpholine (mM./ml.) | Concentration DABCO (mM./ml.) |
|---|---|---|---|
| 5 | $2 \times 10^{-3}$ | | $1 \times 10^{-3}$ |
| 6 | | $4 \times 10^{-3}$ | $1 \times 10^{-3}$ |
| 7 | $2 \times 10^{-3}$ | $1 \times 10^{-3}$ | $1 \times 10^{-3}$ |
| 8 | $2 \times 10^{-3}$ | $2 \times 10^{-3}$ | $1 \times 10^{-3}$ |
| 9 | | | $1 \times 10^{-3}$ |

The results of the experiments described above are tabulated below in Tables IV and V. In the tables, the symbol $k_t$ designates the over-all reaction rate constant due to

---

[1] J. H. Saunders, "The Chemistry of Urethane Foam Formations," Section 2-B of the Seventh Annual Technical Conference Proceedings on "Cellular Plastics—Today's Technology," SPI Cellular Plastics Division, Apr. 24–25, 1963, New York, N.Y.

catalysis by amine and/or stannous octoate, expressed in moles of alcohol (or water) per liter per minute. The symbol $k_a$ represents the contribution to the reaction rate constant that is due solely to the amine catalyst. The symbol $k_a/c_a$ designates the molar rate constant for the amine, in terms of molar concentration units of amine, and is employed to facilitate comparison of the various catalyst activities.

TABLE IV.—CATALYSIS OF THE ALCOHOL-ISOCYANATE REACTION

| Catalyst Compound | Reaction Number | $k_t \times 10^2$ (mole, l.$^{-1}$/min.$^{-1}$) | $k_a \times 10^2$ (mole, l.$^{-1}$/min.$^{-1}$) | $k_a/c_a$ (min.$^{-1}$) |
|---|---|---|---|---|
| (1) Bis[2-(N,N-dimethylamino)ethyl] ether. | 1 | 13.7 | | |
| | 2 | 27.6 | 27.6 | 35 |
| | 3 | 28.9 | 15.2 | 76 |
| | 4 | 37.6 | 23.9 | 60 |
| (2) Bis[2-(N,N-dimethylamino)-1-methylethyl] ether. | 1 | 12.2 | | |
| | 2 | 25.1 | 25.1 | 31 |
| | 3 | 18.0 | 5.8 | 29 |
| | 4 | 22.1 | 9.9 | 25 |
| (3) 2-(N,N-dimethylamino)ethyl 2-(N,N-dimethylamino)-1-methylethyl ether. | 1 | 12.9 | | |
| | 2 | 27.4 | 27.4 | 24 |
| | 3 | 20.4 | 7.5 | 38 |
| | 4 | 25.5 | 12.6 | 32 |
| (4) 1,4-diaza bicyclo[2.2.2]-octane (DABCO). | 1 | 13.6 | | |
| | 2 | 47.8 | 47.8 | 60 |
| | 3 | 23.4 | 9.8 | 49 |
| | 4 | 33.6 | 20.0 | 50 |
| (5) N,N,N',N'-tetramethyl-1,3-butanediamine (TMBDA). | 1 | 17.8 | | |
| | 2 | 16.4 | 16.4 | 21 |
| | 3 | 20.8 | 3.0 | 15 |
| | 4 | 23.9 | 6.1 | 15 |
| (6) N-methylmorpholine (NMM) | 1 | 13.2 | | |
| | 2 | 4.8 | 4.8 | 6 |
| | 3 | 14.7 | 1.5 | 7.5 |
| | 4 | 16.2 | 3.0 | 7.5 |
| | 5 | 18.8 | | |
| | 6 | 8.7 | 2.9 | 7 |
| | 7 | 19.7 | 0.9 | 9 |
| | 8 | 20.4 | 1.6 | 8 |
| | 9 | 5.8 | | |
| (7) N-ethylmorpholine (NEM) | 1 | 13.5 | | |
| | 2 | 3.1 | 3.1 | 4 |
| | 3 | 14.5 | 1.0 | 5 |
| | 4 | 15.4 | 1.9 | 5 |
| | 5 | 19.3 | | |
| | 6 | 7.8 | 1.9 | 5 |
| | 7 | 19.8 | 0.5 | 5 |
| | 8 | 20.3 | 1.0 | 5 |
| | 9 | 5.9 | | |
| (8) Bis[2-(N,N-diethylamino)ethyl] ether. | 1 | 13.4 | | |
| | 2 | 14.6 | 14.6 | 18 |
| | 3 | 15.0 | 1.6 | 8 |
| | 4 | 16.7 | 3.3 | 8 |
| (9) Methyl 2-(N,N-dimethylamino) ethyl ether. | 1 | 15.0 | | |
| | 2 | 9.2 | 9.2 | 12 |
| | 3 | 16.1 | 1.1 | 6 |
| | 4 | 18.1 | 3.1 | 8 |
| (10) Bis[3-(N,N-dimethylamino) propyl]ether. | 1 | 17.0 | | |
| | 2 | 15.3 | 15.3 | 19 |
| | 3 | 20.6 | 3.6 | 18 |
| | 4 | 23.4 | 6.4 | 16 |
| (11) 1,2-bis[2-(N,N-dimethylamino)ethoxy]ethane. | 1 | 17.5 | | |
| | 2 | 14.7 | 14.7 | 18 |
| | 3 | 20.0 | 2.5 | 13 |
| | 4 | 22.2 | 4.7 | 12 |

TABLE V.—CATALYSIS OF THE WATER-ISOCYANATE REACTION

| Catalyst Compound | Reaction Number | $k_t \times 10^2$ (mole, l.$^{-1}$/min.$^{-1}$) | $k_a \times 10^2$ (mole, l.$^{-1}$/min.$^{-1}$) | $k_a/c_a$ (min.$^{-1}$) |
|---|---|---|---|---|
| (1) Bis[2-(N,N-dimethylamino)ethyl] ether. | 1 | 30.9 | | |
| | 2 | 160 | 160 | 200 |
| | 3 | 73.5 | 42.6 | 210 |
| | 4 | 110 | 79.1 | 198 |
| (2) Bis[2-(N,N-dimethylamino)-1-methylethyl]ether. | 1 | 28.3 | | |
| | 2 | 133 | 133 | 166 |
| | 3 | 61.6 | 33.3 | 167 |
| | 4 | 96.9 | 68.6 | 172 |
| (3) 2-(N,N-dimethylamino)ethyl 2-(N,N-dimethylamino)-1-methylethyl ether. | 1 | 28.3 | | |
| | 2 | 154 | 154 | 193 |
| | 3 | 69.8 | 41.5 | 208 |
| | 4 | 98.6 | 70.3 | 176 |
| (4) 1,4-diazadicyclo[2.2.2]octane (DABCO). | 1 | 28.4 | | |
| | 2 | 44.1 | 44.1 | 55 |
| | 3 | 48.0 | 19.6 | 98 |
| | 4 | 55.4 | 27.0 | 68 |
| (5) N,N,N',N'-tetramethyl-1,3-butanediamine (TMBDA). | 1 | 36.3 | | |
| | 2 | 41.2 | 41.2 | 52 |
| | 3 | 49.5 | 13.2 | 66 |
| | 4 | 61.3 | 25.0 | 63 |

TABLE V—Continued

| Catalyst Compound | Reaction Number | $k_t \times 10^2$ (mole, l.$^{-1}$/min.$^{-1}$) | $k_a \times 10^2$ (mole, l.$^{-1}$/min.$^{-1}$) | $k_a/c_a$ (min.$^{-1}$) |
|---|---|---|---|---|
| (6) N-methylmorpholine (NMM) | 1 | 28.4 | --- | --- |
|  | 2 | 12.7 | 12.7 | 16 |
|  | 3 | 31.2 | 2.8 | 14 |
|  | 4 | 34.4 | 6.0 | 15 |
|  | 5 | 38.1 | --- | --- |
|  | 6 | 19.3 | 13.2 | 18 |
|  | 7 | 42.5 | 4.4 | 22 |
|  | 8 | 46.4 | 8.3 | 21 |
|  | 9 | 6.1 | --- | --- |
| (7) N-ethylmorpholine (NEM) | 1 | 27.8 | --- | --- |
|  | 2 | 8.1 | 8.1 | 10 |
|  | 3 | 29.7 | 1.9 | 10 |
|  | 4 | 31.5 | 3.7 | 9 |
|  | 5 | 37.9 | --- | --- |
|  | 6 | 14.3 | 8.5 | 11 |
|  | 7 | 40.8 | 2.9 | 15 |
|  | 8 | 44.2 | 6.3 | 16 |
|  | 9 | 5.8 | --- | --- |
| (8) Bis[2-(N,N-diethylamino)ethyl] ether. | 1 | 30.4 | --- | --- |
|  | 2 | 39.7 | 39.7 | 50 |
|  | 3 | 41.2 | 10.8 | 54 |
|  | 4 | 45.6 | 15.2 | 38 |
| (9) Methyl 2-(N,N-dimethylamino) ethyl ether. | 1 | 32.0 | --- | --- |
|  | 2 | 23.8 | 23.8 | 30 |
|  | 3 | 36.4 | 4.4 | 22 |
|  | 4 | 39.7 | 7.7 | 19 |
| (10) Bis[3-(N,N-dimethylamino) propyl]ether. | 1 | 31.7 | --- | --- |
|  | 2 | 27.4 | 27.4 | 34 |
|  | 3 | 41.3 | 9.6 | 48 |
|  | 4 | 45.6 | 13.9 | 35 |
| (11) 1,2-Bis[2-N,N-dimethylamino) ethoxy]ethane. | 1 | 25.9 | --- | --- |
|  | 2 | 28.3 | 28.3 | 35 |
|  | 3 | 30.8 | 4.9 | 25 |
|  | 4 | 37.3 | 11.4 | 28 |

The above-displayed data illustrates the unexpected catalytic activity of the bis[beta-(N,N-dimethylamino)alkyl] ethers that are employed in the process of the invention. Referring first to Table IV which summarizes the results of the study of the catalysis of the alcohol-isocyanate reaction, the comparison of the results obtained with the 3 bis[beta-(N,N-dimethylamino)alkyl] ethers of the invention (Nos. 1–3) with the results obtained with the 4 tertiary amine ethers of U.S. Patent 2,941,967 (Nos. 8–11) immediately demonstrates the unexpectedly powerful catalytic effect obtained by the process of the invention. In reaction 2, wherein the amine is employed as a sole catalyst, the $k_a$ values found for amines 1–3 were 27.6, 25.1, and 27.4 respectively, while the $k_a$ values found for amines 8–11 were 14.6, 9.2, 15.3, and 14.7 respectively. Unexpectedly, the amines employed in the invention display a catalytic effect almost twice as powerful as the best of amines 8–11. Even more unexpectedly, amines 1–3 display significantly more catalytic power than TMBDA does, and only DABCO, which has a molecular structure such that the amino nitrogens are completely without steric hindrance, gives a higher $k_a$ for reaction 2. Even more surprising is the fact that amine No. 1 displays unexpectedly high synergism when employed in combination with an organic tin catalyst. This is illustrated by reactions 3 and 4 wherein amine No. 1 gives higher values for $k_a$ than DABCO.

Referring now to Table V wherein the data for the catalysis of the water-isocyanate reaction is displayed, amines 1, 2 and 3 yield substantially higher values for $k_a$ than DABCO (160, 133 and 154 versus 44.1 for DABCO).

Example 5

To illustrate the utility of the process of the invention, polyurethane foams were produced using bis[2-(N,N-dimethylamino)ethyl] ether as catalyst. The foams were produced on a standard foaming machine by the one-shot method from the following formulation:

| Component | Parts by Weight | Stream |
|---|---|---|
| Polyol A [1] | 100 | 1 |
| Stannous octoate/polyol A (1/4) | 0.30 | 2 |
| Amine | Varied | |
| Water | 4.0 | 3 |
| Emulsifier A [2] | 0.5 | |
| Emulsifier A | 1.5 | 4 |
| Tolylene diisocyanate | 50.4 | 5 |

[1] The propylene oxide adducts of glycerol having a hydroxyl number of 56.
[2] A polysiloxane-polyoxyalkylene block copolymer having the formula:

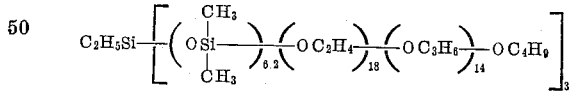

Table VI, below, displays average properties obtained from several runs using the quantity of amine shown:

TABLE VI.—FOAM PROPERTIES WITH BIS[2-(N,N-DIMETHYLAMINO)ETHYL] ETHER CATALYST

| | |
|---|---|
| Quantity of amine (parts by weight) | 0.035 |
| Rise time, seconds | 93 |
| Tensile strength, p.s.i. | 17.8 |
| Elongation, percent | 133 |
| Density, pounds/ft.³ | 1.53 |
| 4-inch ILD 25%, lbs./50 in.² | 40.2 |
| 4-inch ILD 65%, lbs./50 in.² | 72.4 |
| Load loss-static, percent | 21.7 |
| Load loss-Chrysler, percent | 38.0 |
| Compression set, percent | 3.8 |
| Resiliency, percent | 50 |

When DABCO or TMBDA are used as the amine catalyst in the above formulations, equivalent properties are obtained with 0.05 part by weight of DABCO or with 0.07 part by weight of TMBDA. It is seen, therefore, that when bis[2-(N,N-dimethylamino)ethyl] ether is employed as the catalyst in a foam formulation, less of this amine is required as catalyst than was heretofore thought necessary to obtain the desired properties in polyurethane foam. This results in an advantageous economic saving.

Example VI

A series of polyurethane foams were produced by the one-shot method from the following formulation:

| Component: | Parts by weight |
|---|---|
| Polyol A | 100 |
| Water | 4.0 |
| Stannous octoate | 0.25 and 0.35 |
| Amine, as indicated | 0.1 |
| Emulsifier A | 2.0 |
| N,N-dimethylformamide | 2.0 |
| Tolylene diisocyanate | 52.0 |

The table below depicts representative properties of the foams prepared using the three amines of the invention as catalysts.

TABLE VII

| Amine Catalyst | Parts of Stannous Octoate | Rise Time, Seconds | 25% ILD, p.s.i. | Tensile Strength, p.s.i. | Elongation, percent |
|---|---|---|---|---|---|
| Bis[2-(N,N-dimethylamino)-ethyl] ether | 0.25 | 73 | 16.8 | 16.5 | 162 |
|  | 0.35 | 64 | 18.7 | 16.0 | 161 |
| Bis[2-(N,N-dimethylamino)-1-methylethyl] ether | 0.25 | 75 | 17.4 | 13.2 | 120 |
|  | 0.35 | 63 | 20.0 | 14.3 | 132 |
| 2-(N,N-dimethylamino) ethyl 2-(N,N-dimethylamino)-1-methylethyl ether | 0.25 | 68 | 16.8 | 15.0 | 133 |
|  | 0.35 | 59 | 21.1 | 14.3 | 120 |

What is claimed is:

1. Process which comprises reacting an organic isocyanate with a composition that contains active hydrogen as measured and determined by the Zerewitinoff method, in the presence of a catalytic quantity of bis[beta-(N,N-dimethylamino)alkyl] ether wherein the alkyl has from 2 to 3 carbon atoms.

2. Process which comprises reacting an organic isocyanate with an alcohol in the presence of a catalytic quantity of bis[beta-(N,N-dimethylamino)alkyl] ether wherein the alkyl has from 2 to 3 carbon atoms.

3. Process which comprises reacting an organic isocyanate with water in the presence of a catalytic quantity of bis[beta-(N,N-dimethylamino)alkyl] ether wherein the alkyl has from 2 to 3 carbon atoms.

4. Process which comprises reacting an organic isocyanate with a composition that contains active hydrogen as measured and determined by the Zerewitinoff method, in the presence of a catalytic quantity of an organic tin compound and a bis[beta-(N,N-dimethylamino)alkyl] ether wherein the alkyl has from 2 to 3 carbon atoms.

5. The process of claim 4 wherein the organic tin compound is a stannous acylate.

6. The process of claim 5 wherein the stannous acylate is stannous octoate.

7. Process which comprises reacting an organic isocyanate with a composition that contains active hydrogen as measured and determined by the Zerewitinoff method, in the presence of a catalytic quantity of bis[2-(N,N-dimethylamino)ethyl] ether.

8. Process which comprises reacting an organic isocyanate with an alcohol in the presence of a catalytic quantity of bis[2-(N,N-dimethylamino)ethyl] ether.

9. Process which comprises reacting an organic isocyanate with an alcohol in the presence of a catalytic quantity of a stannous acylate and bis[2-(N,N-dimethylamino)ethyl] ether.

10. Process which comprises reacting an organic isocyanate with water in the presence of a catalytic quantity of bis[2-(N,N-dimethylamino)ethyl] ether.

11. Process for the production of polyurethane foams which comprises reacting an organic polyisocyanate with a polyol in the presence of a blowing agent and a catalytic quantity of bis[beta-(N,N - dimethylamino)alkyl] ether wherein the alkyl has from 2 to 3 carbon atoms.

12. Process for the production of polyurethane foams which comprises reacting an organic polyisocyanate with a polyol in the presence of a blowing agent and a catalytic quantity of an organic tin compound and a bis[beta-(N,N-dimethylamino)alkyl] ether wherein the alkyl has from 2 to 3 carbon atoms.

13. Process for the production of polyurethane foams which comprises reacting an organic polyisocyanate with a polyol in the presence of an emulsifier, a blowing agent, and a catalytic quantity of bis[2-(N,N-dimethylamino)ethyl] ether.

14. Process which comprises reacting an organic isocyanate with a composition that contains active hydrogen as measured and determined by the Zerewitinoff method, in the presence of a catalytic quantity of bis[2-(N,N-dimethylamino)-1-methylethyl] ether.

15. Process which comprises reacting an organic isocyanate with an alcohol in the presence of a catalytic quantity of bis[2-(N,N-dimethylamino)-1-methylethyl] ether.

16. Process which comprises reacting an organic isocyanate with water in the presence of a catalytic quantity of bis[2-(N,N-dimethylamino)-1-methylethyl] ether.

17. Process which comprises reacting an organic isocyanate with a composition that contains active hydrogen as measured and determined by the Zerewitinoff method, in the presence of a catalytic quantity of 2-(N,N-dimethylamino)ethyl 2 - (N,N - dimethylamino)-1-methylethyl ether.

18. Process which comprises reacting an organic isocyanate with an alcohol in the presence of a catalytic quantity of 2-(N,N-dimethylamino)ethyl 2-(N,N-dimethylamino)-1-methylethyl ether.

19. Process which comprises reacting an organic isocyanate with water in the presence of a catalytic quantity of 2-(N,N-dimethylamino)ethyl 2-(N,N-dimethylamino)-1-methylethyl ether.

References Cited

UNITED STATES PATENTS

| 2,941,967 | 6/1960 | Moller et al. | 260—2.5 |
| 3,060,137 | 10/1962 | Gememhardt et al. | 260—2.5 |

FOREIGN PATENTS

| 1,152,817 | 8/1963 | Germany. |

OTHER REFERENCES

Saunders et al.: "Polyurethanes: Chemistry and Technology," Part I, pages 161–173, 180–186 and 227–232. Copyright 1963, received in Scientific Lib. 10–11–63.

DONALD E. CZAJA, *Primary Examiner.*

LEON J. BERCOVITZ, *Examiner.*

C. W. IVY, *Assistant Examiner.*